United States Patent [19]

Harter et al.

[11] Patent Number: 4,660,205
[45] Date of Patent: Apr. 21, 1987

[54] MULTI-RESONATOR SWITCHING LASER

[75] Inventors: Donald J. Harter, Berkeley Heights, N.J.; Jen-Jye Yeh, Newbury Park, Calif.

[73] Assignee: Allied Corporation, Morris Township, Morris County, N.J.

[21] Appl. No.: 733,359

[22] Filed: May 13, 1985

[51] Int. Cl.[4] .............................................. H01S 3/098
[52] U.S. Cl. ....................................... 372/18; 372/12; 372/20; 372/27; 372/99; 372/103; 372/23; 372/94; 372/95
[58] Field of Search .................... 372/18, 9, 12, 20, 27, 372/98, 99, 103, 23, 94, 95

[56] References Cited

U.S. PATENT DOCUMENTS

| | | | |
|---|---|---|---|
| 3,564,454 | 2/1971 | Hook et al. | 372/12 |
| 3,577,097 | 5/1971 | Hilberg | 372/12 |
| 3,713,032 | 1/1973 | Wentz | 372/12 |
| 3,737,231 | 6/1973 | Low et al. | 372/12 |
| 3,836,866 | 9/1974 | Ammann et al. | 372/12 |
| 3,965,440 | 6/1976 | Graves | 372/20 |
| 4,413,342 | 11/1983 | Cohen et al. | 372/27 |
| 4,455,657 | 6/1984 | Byer | 372/18 |
| 4,490,823 | 12/1984 | Komine et al. | 372/95 |
| 4,559,627 | 12/1985 | Chen | 372/103 |

OTHER PUBLICATIONS

Tam et al; "Intensity Stabilization by Controlled Self-injection in a Pulsed Ring Dye Laser", Opt. Comm. vol. 49, No. 5, 1 Apr. 84, p. 349.
Forsyth, Appl. Phys. Lett. 11 391 (1967).
Liu, Opt. Lett. 3 167 (1978).
Palange et al., Appl. Phys. Lett. 41, 213 (1982).
Solid-State Laser Engineering, W. Koechner, Springer-Verlag, New York (1976) pp. 441ff–444ff.

Primary Examiner—Leon Scott, Jr
Attorney, Agent, or Firm—Gerhard H. Fuchs; James Riesenfeld

[57] ABSTRACT

A laser comprises a laser medium and multiple resonators, together with means for switching coherent radiation from one resonator to another. If one of the resonators includes appropriate loss means, the laser can be self injection-locked and provide high-power, single-longitudinal mode radiation. Another embodiment of the laser provides successive laser pulses, separated by a short time interval and having different characteristics. A phase conjugate laser and an improved ring laser are also provided.

30 Claims, 4 Drawing Figures

MULTI-RESONATOR SWITCHING LASER

DESCRIPTION

1. Field of the Invention.

This invention relates to a laser that is adapted for lasing in more than one resonator; more particularly, a laser in which the radiation can be selectively switched among the resonators.

2. Description of the Prior Art.

In a conventional laser, coherent radiation is maintained between reflectors at opposite ends of a resonator cavity. In a ring laser, by the use of additional reflectors, radiation is maintained around a closed loop. Multiple resonators have been disclosed by Forsyth, Appl. Phys. Lett. 11, 391 (1967).

Liu, Opt. Lett. 3, 167 (1978), disclosed a "cavity-flipping" technique, which he used in order to produce pulses of very short duration—nanoseconds or less. He incorporated into the resonant cavity of a laser-pumped dye laser, a polarizer and a Pockels cell driven by a circuit that determines the polarization of the cell. By flipping the polarization at a precisely-chosen time, a regenerative dye laser pulse is generated, whose pulse duration is extremely short. Addition pulse shortening can be achieved by the use of a nonlinear absorber. This cavity-flipping technique has also been extended to solid-state lasers to achieve high peak power YAG pulses of less than a nanosecond duration (see Palange et al., Appl. Phys. Lett. 41, 213 (1982)).

Another technique for achieving extremely short laser pulses uses pulse-transmission mode (PTM) Q-switches. This device also uses a Pockels cell and polarizer to rapidly drain the energy from a laser cavity. In essence, the apparatus amounts to a high-speed, voltage-variable mirror, whose reflectivity can be changed rapidly between 0 percent and 100 percent (see *Solid-State Laser Engineering*, W. Koechner, Springer-Verlag, New York (1976), pp. 441ff). A similar technique is used for cavity dumping of CW-pumped solid-state lasers (op. cit., pp. 444ff).

A common characteristic of the lasers discussed above is that the path along which the radiation circulates in the laser remains constant, although part of the radiation may be "dumped."

U.S. Pat. No. 4,455,657, issued June 19, 1984, to Byer, discloses a laser that achieves high gain Q-switched lasing in a single axial mode. That result is accomplished by providing a Q-switched multiple axial mode high-gain oscillator, another oscillator that generates a stable optical wave at a frequency within the band of the multiple modes, and a coupler for injecting the stable wave into the high-gain oscillator. In the high-gain oscillator, the axial mode nearest the stable wave frequency is enhanced and the other modes suppressed. The device uses two laser oscillators to generate the desired output beam.

Recently, an injection-locked unstable resonator was disclosed in U.S. Pat. No. 4,490,823, issued Dec. 25, 1984 to Komine et al. The laser system disclosed there comprises a first, stable resonator cavity, which produces "seed radiation;" a second, unstable resonator; and an optical switch for selectively directing radiation to either the stable or unstable resonator. The stable resonator preferably includes a grating reflector, etalon, beam expander, and aperture for precise wavelength selection.

SUMMARY OF THE INVENTION

In accordance with the present invention, a self injection-locked laser comprises:

a laser medium and means for exciting the laser medium to emit coherent radiation;

first and second reflectors disposed on either side of the laser medium to reflect the coherent radiation along a first path substantially perpendicular to each of the reflectors, the first and second reflectors defining a first resonator;

resonator-switching means disposed between the laser medium and the first reflector. The resonator-switching means either transmit the coherent radiation or, if desired, reflect the coherent radiation from the laser medium to a second path;

means to control the resonator-switching means so that it is initially transmitting and subsequently reflecting;

a third reflector to reflect back toward the resonator-switching means coherent radiation incident on it along the second path. The second and third reflectors thus define a second resonator. The third reflector is partially transmitting unless the second reflector is partially transmitting, so that laser emission is from either the third or second reflector; and loss means disposed between the resonator-switching means and first reflector sufficient to permit laser output in a single longitudinal mode from the partially-transmitting second or third reflector.

Note that the second reflector, laser medium, and resonator-switching means are common to both the first and second resonators.

In another embodiment, the present invention provides a multi-pulse laser that comprises:

a laser medium and means to excite the laser medium to emit coherent radiation, first and second reflectors disposed on either side of the laser medium to form a first resonator and to reflect the coherent radiation along a first path that traverses the resonator, resonator-switching means disposed between the laser medium and the first reflector either to transmit the coherent radiation or, if desired, to reflect the coherent radiation from the laser medium to a second path, a third reflector to form, with the second reflector, a second resonator and to reflect back toward the resonator-switching means coherent radiation incident on it along the second path, means to generate in the laser a plurality of output pulses, and means to switch the resonator-switching means from transmitting to reflecting, whereby successive laser pulses can be emitted from different resonators.

In an improved ring laser for propagating coherent radiation in a closed unidirectional path, the present invention provides an improvement comprising:

two alternate sections for the radiation to follow in traversing a part of the path and resonator-switching means for selectively directing the radiation through one of the sections.

A phase conjugate laser of the present invention comprises:

a laser medium and means for exciting the laser medium to emit coherent radiation;

first and second reflectors disposed on either side of the laser medium to reflect the coherent radiation along a first path substantially perpendicular to each of the reflectors, the second reflector being partially transmitting, and the first and second reflectors defining a first resonator;

resonator-switching means disposed between the laser medium and the first reflector. The resonator-switching means either transmit the coherent radiation or, if desired, reflect the coherent radiation from the laser medium to a second path;

means to control the resonator-switching means so that it is initially transmitting and subsequently reflecting; and a third reflector to reflect back toward the resonator-switching means coherent radiation incident on it along the second path. The second and third reflectors thus define a second resonator. The third reflector comprises a phase conjugate reflector, whereby laser output from the second reflector is corrected for intra-resonator aberrations.

Note that the second reflector, laser medium, and resonator-switching means are common to both the first and second resonators.

DETAILED DESCRIPTION OF THE INVENTION

Figure 1:
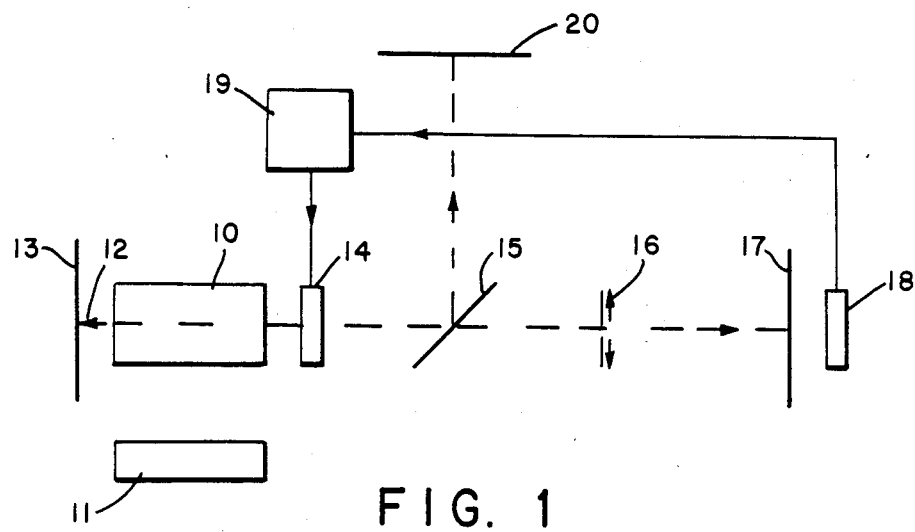
FIG. 1 is a schematic of a self injection-locked oscillator of the present invention.

When a laser is operated high above threshold, single-longitudinal mode output is difficult to maintain for an extended period of time. Part of the problem is finding a line-narrowing element that has low loss for one longitudinal mode of the resonator, yet has sufficient loss to prevent adjacent modes from lasing when the gain of the laser medium is high. In addition, such a highly discriminating line-narrowing element is difficult to tune to one of the cavity modes, since the frequencies of the cavity modes are subject to drift over long periods of time (~seconds) due to thermal and mechanical effects.

One method for producing reliable single-longitudinal mode output is to injection-lock a laser that is operating high above threshold with another laser that is operating near threshold in a single longitudinal mode. The line-narrowing elements in the injecting laser, operating near threshold, need not be as discriminating against adjacent modes as must the elements in a single line-narrowed laser operating high above threshold, because with lower gain, it is easier to keep adjacent modes below threshold. Furthermore, since the overall efficiency of a single-mode injection-locked laser system is primarily determined by the efficiency of the high-power (injected) laser, rather than that of the low-power (injecting) laser, the impact of the line-narrowing elements on the laser system efficiency is reduced.

In general, injection-locking involves seeding the output from a low-power single-longitudinal mode laser into the resonator of a high-power laser. The signal is injected just after the Q-switch of the high-power laser has been switched, so that the Q-switched pulse of the high-power laser grows from the line-narrowed, injected signal rather than from intracavity broadband noise (i.e., fluorescence). Injection locking has been investigated for producing high power output from $Nd^{3+}$:YAG in a single longitudinal mode. (See Park et al., IEEE J. Quantum Electron. QE-20, 117 (1984)). Rapoport et al. (CLEO '83, Baltimore, MD, May 1983) have investigated injection-locked multi-longitudinal mode alexandrite lasers.

In one embodiment, the present invention provides a laser that has at least two resonators, one of which operates near threshold, and that includes means for switching the radiation between resonators. The resonators each consist of a common section, which includes a reflector, the laser medium, and the resonator-switching means; and a second section that includes a reflector and, optionally, other components.

Switching can be accomplished rapidly and can be triggered by the radiation in the first resonator. The switching means can be an acousto-optical modulator that directs an incident beam in different directions, depending on the driver signal. A preferred switching means comprises an electro-optical element, which introduces a controllable change in the polarization of the incident radiation, and a polarizer, which, depending on the polarization, directs the radiation to the first or second resonator. The electro-optical element may be a crystal or liquid that has controllable birefringence. Depending on the laser medium and intracavity elements, the beam incident on the electro-optical element may be plane polarized or circularly polarized. If the beam is circularly polarized, additional elements are necessary to provide both hold-off and switching with the electro-optical element; for example, a quarter wave plate and a polarizer placed in the beam before it is incident on the electro-optical device.

One embodiment of this invention is a self injection-locked oscillator, depicted in FIG. 1. Laser medium 10 is pumped by flashlamp 11 to emit coherent radiation 12, which is reflected back through the laser medium by reflector 13. Initially, electro-optical element 14 is biased so that the beam passes through polarizer 15 and loss element 16, to reflector 17. In combination, elements 14 and 15 serve as a resonator switch. Loss element 16 preferably provides variable loss; for example, as is shown in FIG. 1, it may be a variable narrow aperture. It provides the loss necessary to keep operation of the first resonator near threshold. The intensity of radiation passing through reflector 17 is measured by optional detector 18, which may be a photodiode. When the measured intensity exceeds a preset value, detector 18 initiates a signal to driver 19 that changes the bias on the electro-optical element so as to alter the polarization of the beam and cause it to be reflected by polarizer 15 to reflector 20. As the beam makes multiple passes through the "second resonator," bounded by reflectors 20 and 13, the power builds up, and the resultant radiation has high power and narrow linewidth. Depending on which of the two is partially transmitting, the beam is emitted through either reflector 13 or reflector 20.

The laser shown in FIG. 1 is an optically-pumped solid-state laser; however, other lasers, such as gas lasers, dye lasers, etc. are also suitable. A tunable solid-state medium, such as alexandrite, is preferred. In that case, a tuning means is included. Depending on the parameters of the tuning means, the laser can be tuned to any wavelength in the range over which the laser operates. A preferred tuning means is a multi-element birefringent tuner, which may also include one or more etalons.

It is necessary to operate the first resonator at a low power level, close to threshold, to maintain a single longitudinal mode and to avoid damaging the tuning element. Thus, one or more loss elements are located in the first resonator. The loss element(s) causes the duration of the pulse developed in the first resonator to be long, generally at least five times the round-trip resonator transit time. The loss element is such that gain is at or just above the threshold for lasing in a single longitudinal mode but is below threshold for all other modes. Preferred loss elements are adjustable, such as a variable aperture, an etalon whose tilt angle controls loss, or a Q-switch. In optimum operation, loss is adjusted until the first resonator provides a single laser pulse at the end of the pump pulse. In that way the entire pump pulse is used and serves to create the maximum population inversion.

Figure 2:
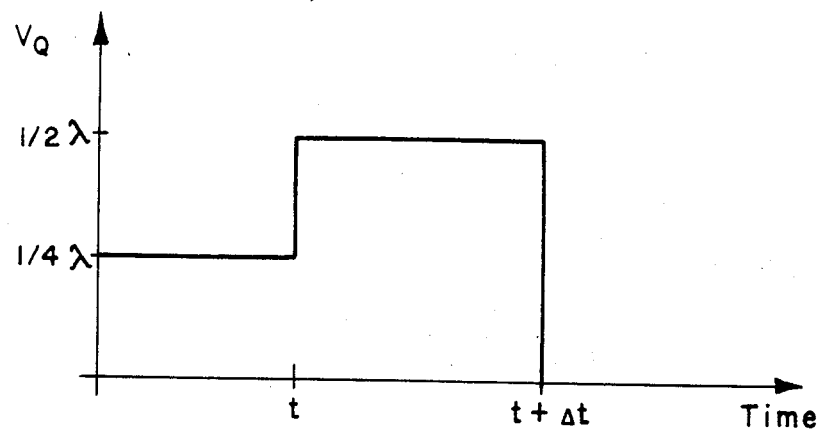
FIG. 2 shows a time-dependent signal to provide three-level Q-switch biasing.

Both electro-optical element 14 and loss element 16 can independently be Q-switched. Alternatively, a single electro-optical element 14, i.e., a Q-switch, can serve both to hold off lasing in the first resonator and to change the polarization of the beam for resonator-switching. When a Q-switch performs the two functions, it may operate as follows, where we assume the laser is flashlamp pumped:

The Q-switch is first biased to act as a quarter-wave plate, as depicted in FIG. 2. At a time t, the Q-switch is switched to a half-wave plate, so the signal starts to build up through the first resonator. A short time ($\Delta t$) later, before the signal is very large, the Q-switch is switched to a zero-wave plate, and the laser starts to lase in the second resonator with the narrow linewidth signal from the first resonator. After the radiation is switched to the second resonator, the laser pulse power builds up, while the narrow linewidth is retained. Additional resonators may be added, provided that a resonator-switching means is added for each additional resonator.

The self injection-locked oscillator provides significant advantages over alternate routes to a high-power, narrow-linewidth laser pulse. If a single resonator were used, then efficiency would be reduced by the lossy line-narrowing elements. Furthermore, these elements would be subjected to high intensity radiation which could damage them. If conventional injection-locking were used, an additional laser would be needed.

In an alternate embodiment of the present invention, a tuning means can be incorporated in the second resonator, as well as in the first. This second tuning means can provide additional line-narrowing. Alternatively, when used in a tunable laser, it can be tuned to a wavelength different from that to which the first tuner is tuned.

Another embodiment of a multi-resonator laser is a multi-pulse laser, which provides successive pulses that are closely spaced in time and are emitted from the different resonators of a single laser. Since the resonator-switching means switches the radiation very quickly, successive pulses can be emitted from different resonators even if pulse repetition frequency is very high.

The multi-pulse laser is substantially as shown in FIG. 1, although it need not include a loss means (tuning element) 16. In general, the parameters of the resonators are different; thus, the output pulses are different. For example, if the curvature of reflectors 17 and 20 in the two resonators is different, the spatial profile of successive pulses can be different. Alternatively, single-transverse mode output pulses from one of the resonators can be accomplished by including in that resonator a suitable aperture. The two resonators have reflector 13 in common. Preferably, that reflector is partially transmitting, and all pulses are emitted along the same path.

A particularly preferred multi-pulse laser is tunable over a range of wavelengths; for example, a tunable solid state laser, such as alexandrite. If tuning elements are disposed in each resonator, and the elements are tuned to different wavelengths, then successive pulses can be emitted at different wavelengths.

The resonator-switching means can, in addition to reflecting or transmitting radiation incident on it, also include a Q-switch to hold off lasing. Alternatively, a Q-switch can be included in one resonator, but not in the other, to permit alternate pulses to be Q-switched.

The characteristics of each pulse are determined by the parameters of the resonator from which it emerges. Depending on the pattern of signals supplied to the resonator-switching means, alternate pulses can be emitted from the same resonator, or a different pulse-switching pattern can be achieved.

A potential drawback in operating a laser of the type shown in FIG. 1 in a single longitudinal mode is that standing waves are set up in the resonant cavity. Depending on the laser medium, there may be no gain saturation at the nodes and non-uniform power density distribution in the resonator.

To overcome the problems caused by these standing waves, the present invention can be incorporated into a ring laser. In a ring laser, radiation travels in a single direction, instead of oscillating back and forth between parallel reflectors at the ends of a resonant cavity (as shown in FIG. 1). Thus, standing waves are avoided.

Figure 3:
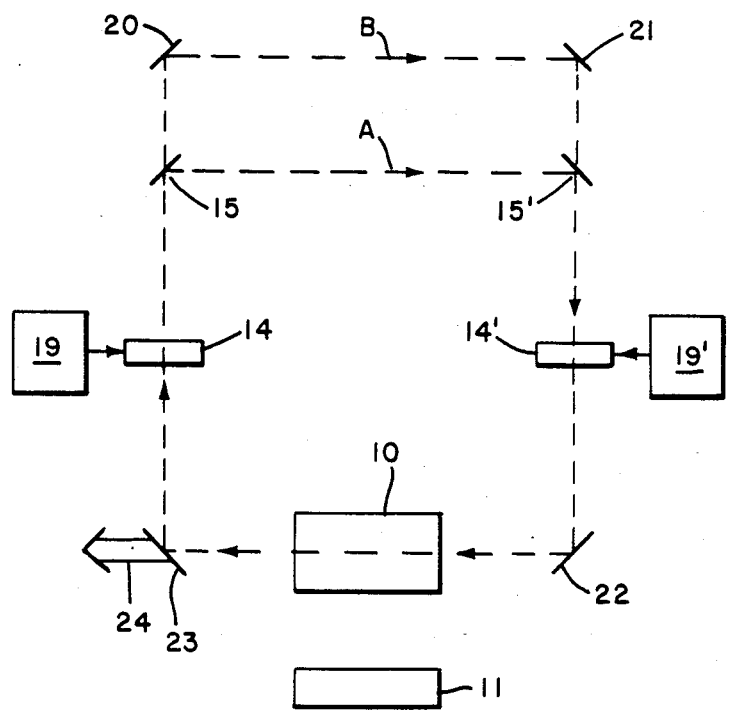
FIG. 3 is a schematic of a ring laser of the present invention.

A schematic of a multi-resonator switching ring laser is shown in FIG. 3, where the radiation follows a clockwise path. Electro-optical elements 14 and 14' are biased by drivers 19 and 19', respectively. Depending on the bias applied to the electro-optical elements, the polarization of coherent radiation passing through them becomes such that polarizers 15 and 15' either reflect the radiation incident on then—to traverse section A—or transmit the radiation—to traverse section B. Mirrors 20, 21, and 22 may be totally reflecting; output coupler 23 is partially transparent, to permit passing the laser beam 24.

Another embodiment of the present invention provides an improved phase conjugate laser. These lasers are described by C. R. Giuliano et al., Laser Focus 19, 55 (Feb. 1983). A phase conjugate laser is one that uses conjugate wave generation to provide higher output power and improved beam quality. A phase conjugate reflector at one end of a resonator creates a new wave that travels in the opposite direction to, and that has the opposite phase to, an incident wave. As a result, the return wave corrects for distortions that are introduced by the intracavity elements, and if the beam is extracted from the ordinary reflector at the opposite end of the resonator, the transverse phase of the output is independent of distortion from those elements.

Among the nonlinear optical phenomena that can produce phase conjugation, the present invention finds particular advantage for a reflector that uses stimulated Brillouin scattering (SBS). A characteristic of phase conjugation by SBS is that it has an intensity threshold.

Figure 4:
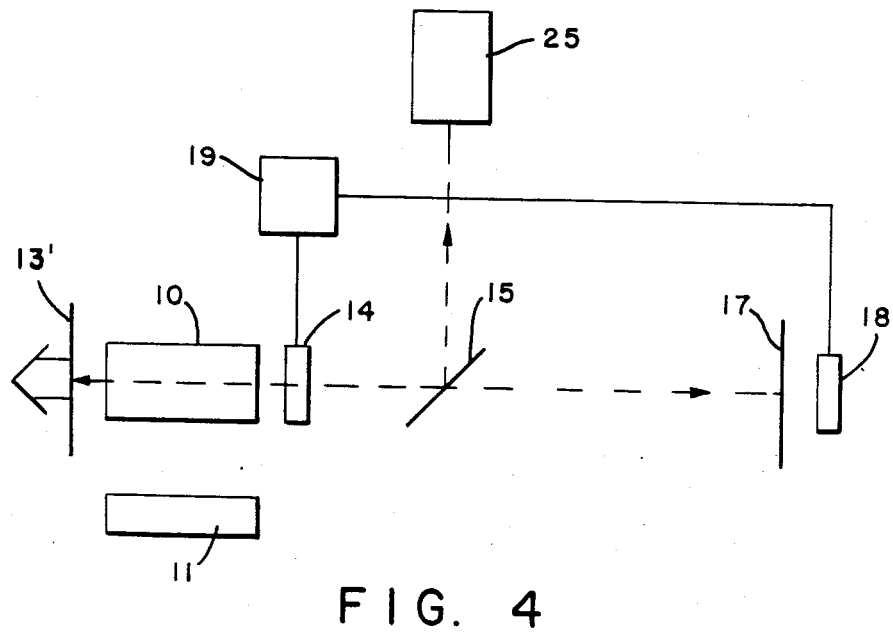
FIG. 4 is a schematic of a phase conjugate laser of the present invention.

FIG. 4 depicts an embodiment of the present invention that involves an SBS reflector for phase conjugation. As with the embodiment depicted in FIG. 1, lasing is initially maintained in the first resonator until a preset intensity is sensed by detector 18. At that point, the electro-optical cell 14 is biased so that the beam is directed toward phase conjugate reflector 25. The preset intensity that initiates the signal from detector 18 to cell 14 is chosen so that the beam intensity thereafter incident on phase conjugate reflector 25 exceeds the SBS intensity threshold. The laser beam emitted from output coupler 13' has high quality, corrected for intracavity aberrations. A large variety of materials are suitable for use in the phase conjugate reflector, because the SBS "effect can occur in almost any solid, liquid or gaseous medium." D. Hon, Opt. Eng. 21, 252 (1982). Among the SBS materials that have been disclosed in the literature are ether, ethanol, pressurized gases, etc. (see, e.g., V. A. Boiko et al., Sov. J. Quant. Electron. 12, 970 (1982) and M. C. Gower et al., Opt. Lett. 7, 162 (1982)).

We claim:

1. A self injection-locked laser that comprises:
a laser medium,
(b) means for exciting the laser medium to emit coherent radiation,
(c) first and second reflectors disposed on either side of the laser medium to reflect the coherent radiation along a first resonator path substantially perpendicular to each of the reflectors,
(d) resonator-switching means disposed between the laser medium and the first reflector either to transmit the coherent radiation or to reflect the coherent radiation from the laser medium to a second resonator path,
(e) means to control the resonator-switching means so that it is initially transmitting and subsequently reflecting,
(f) a third reflector to reflect back toward the resonator-switching means coherent radiation incident on it along the second resonator path, the third reflector or the second being partially transmitting, and
(g) loss means disposed between the resonator-switching means and first reflector sufficient to permit laser output in a single longitudinal mode from the partially-transmitting second or third reflector.

2. The laser of claim 1 in which the resonator-switching means comprises
(a) an electro-optical element for selectively introducing a change in polarization of the coherent radiation and
(b) a polarizer positioned to maintain the coherent radiation incident on it between the first and second reflectors or between the second and third reflectors, depending on the polarization of the coherent radiation incident on the polarizer.

3. The laser of claim 2 further comprising a quarter-wave plate and a second polarizer for plane-polarizing coherent radiation incident on it and for directing the plane-polarized radiation to the electro-optical element.

4. The laser of claim 1 in which the loss means provides a variable loss.

5. The laser of claim 1 in which the loss means comprises a variable aperture.

6. The laser of claim 1 in which the loss means includes tuning means for narrowing the wavelength band of the coherent radiation.

7. The laser of claim 1 in which the means to excite the laser medium is a flashlamp.

8. The laser of claim 7 in which the laser is a tunable solid-state laser.

9. The laser of claim 8 in which the laser medium is alexandrite.

10. The laser of claim 6 in which the tuning means comprises a multi-element birefringent tuner.

11. The laser of claim 10 in which the tuning means further comprises at least one etalon.

12. The laser of claim 1 further comprising means to sense the radiation intensity between the first and second reflector and means to trigger the resonator-switching means in response to the sensed radiation intensity.

13. The laser of claim 1 further comprising means to Q-switch the laser.

14. The laser of claim 1 in which the resonator-switching means controls the onset of laser emission.

15. The laser of claim 6 further comprising a second tuning means between the resonator-switching means and the third reflector.

16. A multi-pulse laser that comprises:
(a) a laser medium,
(b) means to excite the laser medium to emit coherent radiation,
(c) first and second reflectors disposed on either side of the laser medium to form a first resonator and to reflect the coherent radiation along a first path that traverses the resonator,
(d) resonator-switching means disposed between the laser medium and the first reflector either to transmit the coherent radiation or to reflect the coherent radiation from the laser medium to a second path,
(e) a third reflector to form, with the second reflector, a second resonator and to reflect back toward the resonator-switching means coherent radiation incident on it along the second path,
(f) means to generate in the laser a plurality of output pulses, and
(g) means to switch the resonator-switching means from transmitting to reflecting, such that successive laser pulses can be emitted from each of said first and second resonators.

17. The laser of claim 16 in which the means to excite the laser medium is a flashlamp.

18. The laser of claim 16 in which the second reflector is partially transmitting, whereby all pulses are emitted through that reflector.

19. The laser of claim 16 in which at least one of the first and third reflectors is curved and the curvature of the reflectors is different, whereby a spatial profile of successive pulses can be different.

20. The laser of claim 16 in which the resonator-switching means controls the onset of laser emission.

21. The laser of claim 16 in which the laser is tunable over a range of wavelengths.

22. The laser of claim 21 in which the laser is a tunable solid-state laser.

23. The laser of claim 22 in which the laser medium is alexandrite.

24. The laser of claim 21 further comprising in each of said first and second resonators tuning means tuned to different wavelengths in said range, whereby successive pulses can be emitted at different wavelengths.

25. The laser of claim 16 further comprising a Q-switch disposed in one of the resonators but not in the other, whereby alternate pulses can be Q-switched.

26. The laser of claim 16 further comprising an aperture in one of the resonators to permit output pulses in a single transverse mode from that resonator.

27. In a ring laser for propagating coherent radiation in a closed unidirectional path, an improvement comprising:
(a) two alternate sections for the radiation to follow in traversing a part of the path and
(b) resonator-switching means for selectively directing the radiation through one of the sections.

28. The ring laser of claim 27 in which the resonator-switching means comprises a pair of polarizers at two ends of one of the sections, each polarizer associated with an electro-optical element that is disposed in the radiation path and that is adapted for selectively introducing a change in the polarization of the coherent radiation.

29. A phase conjugate laser that comprises:
(a) a laser medium,
(b) means for exciting the laser medium to emit coherent radiation,
(c) first and second reflectors disposed on either side of the laser medium to reflect the coherent radiation along a first resonator path substantially perpendicular to each of the reflectors, the second reflector being partially transmitting,
(d) resonator-switching means disposed between the laser medium and the first reflector either to transmit the coherent radiation or to reflect the coherent radiation from the laser medium to a second resonator path,
(e) means to control the resonator-switching means so that it is initially transmitting and subsequently reflecting, and
(f) a third reflector to reflect back toward the resonator-switching means coherent radiation incident on it along the second resonator path, the third reflector comprising, a phase conjugate reflector, such that laser output from the second reflector is corrected for intra-resonator aberrations.

30. The laser of claim 29 in which the phase conjugate reflector comprises a stimulated Brillouin scattering material.

* * * * *